(12) United States Patent  (10) Patent No.: US 9,028,215 B2
Smook  (45) Date of Patent: May 12, 2015

(54) NACELLE MAIN FRAME STRUCTURE AND DRIVE TRAIN ASSEMBLY FOR A WIND TURBINE

(75) Inventor: Warren Smook, Huldenberg (BE)

(73) Assignee: ZF Wind Power Antwerpen N.V., Lommel (BE)

( * ) Notice: Subject to any disclaimer, the term of this patent is extended or adjusted under 35 U.S.C. 154(b) by 463 days.

(21) Appl. No.: 13/469,124

(22) Filed: May 11, 2012

(65) Prior Publication Data

US 2012/0308388 A1   Dec. 6, 2012

(30) Foreign Application Priority Data

Jun. 1, 2011  (EP) .................................... 11168522

(51) Int. Cl.
*F03D 1/00* (2006.01)
*F03D 11/04* (2006.01)

(52) U.S. Cl.
CPC ................ *F03D 1/001* (2013.01); *F03D 11/04* (2013.01); *F05B 2240/14* (2013.01); *F05B 2240/916* (2013.01); *Y02E 10/726* (2013.01); *Y02E 10/728* (2013.01)

(58) Field of Classification Search
CPC ....... F03D 1/001; F03D 11/04; Y02E 10/726; Y02E 10/728; F05B 2240/916; F05B 2240/14; B66C 23/207; B66C 23/185
USPC ................ 416/170 R, 171; 415/122.1, 124.2; 290/44, 55
See application file for complete search history.

(56) References Cited

U.S. PATENT DOCUMENTS

| 6,872,049 | B2* | 3/2005 | Christensen ................ 415/124.1 |
| 7,282,808 | B2* | 10/2007 | Shibata et al. .................. 290/55 |
| 7,735,808 | B2 | 6/2010 | Viladomiu I Guarro et al. |
| 2010/0032961 | A1* | 2/2010 | Numajiri ......................... 290/55 |
| 2010/0133848 | A1 | 6/2010 | Piasecki |
| 2011/0101699 | A1* | 5/2011 | Segovia et al. ................. 290/55 |

FOREIGN PATENT DOCUMENTS

| DE | 10 2008 051 274 B3 | 6/2010 |
| EP | 1 291 521 A1 | 3/2003 |
| EP | 1291521 A1 * | 3/2003 |
| EP | 1 677 005 A1 | 7/2006 |
| EP | 2 317 137 A1 | 5/2011 |
| WO | 96/10130 A1 | 4/1996 |
| WO | 02/079644 A1 | 10/2002 |
| WO | 2010/024510 A1 | 3/2010 |
| WO | WO 2010024510 A1 * | 3/2010 |

* cited by examiner

*Primary Examiner* — Dwayne J White
*Assistant Examiner* — Brian P Wolcott
(74) *Attorney, Agent, or Firm* — Davis & Bujold, P.L.L.C.; Michael J. Bujold

(57) ABSTRACT

A nacelle main frame structure and drive train assembly (1) for being mounted on a tower (2) of a wind turbine. The nacelle main frame structure and drive train assembly (1) comprises a nacelle main frame structure (4) with a central part (6) connecting a first part (7) to a second part (8). The first part (7), during wind turbine operation and/or servicing activities, takes up loads of a rotor (9). A drive train (5) is at least partially located between the first and second parts (7, 8). The central part (6) of the main frame structure (4) is located substantially above at least part of the drive train (5) and is such that at least part of the drive train (5) can only be removed from the main frame structure (4) by lowering at least part of the drive train (5) from the main frame structure (4).

18 Claims, 9 Drawing Sheets

NACELLE MAIN FRAME STRUCTURE AND DRIVE TRAIN ASSEMBLY FOR A WIND TURBINE

This application claims priority from European patent application no. 11 168 522.8 filed Jun. 1, 2011.

TECHNICAL FIELD OF THE INVENTION

The present invention relates to a nacelle main frame structure and drive train assembly for a wind turbine. More particularly the present invention relates to a nacelle main frame structure and drive train assembly which facilitates the performance of servicing activities.

BACKGROUND OF THE INVENTION

Servicing, e.g. maintenance or component replacement of wind turbine drive train components such as a gearbox and/or generator, is in many cases a difficult and expensive activity. Therefore, wind turbine designs should not only be reliable in order to limit servicing activities, but should also be service friendly such that servicing, when necessary, can be performed easily and at low cost.

Nowadays, a lot of effort is done to find solutions for making servicing activities of wind turbines easier and less expensive. One way for obtaining this is to provide a crane on the nacelle structure, thereby eliminating the need for large external cranes. An example hereof is illustrated in EP 1 291 521 which describes a wind turbine comprising a nacelle. The nacelle comprises a rotor and a rotor locking means for preventing rotation of the rotor during maintenance of the nacelle. Furthermore, at a bottom of the nacelle a door is provided for removing wind turbine components, such as gearbox, generator or main shaft, from the nacelle. Before they can be removed from the nacelle through the door, the components first have to be moved backwards, i.e. away from the rotor, in a direction parallel to the axis of the drive train. This can imply that other components present in the nacelle also have to be removed or displaced before the components to be serviced or replaced can be removed from the nacelle.

Another example is illustrated in U.S. Pat. No. 7,735,808 wherein a nacelle frame assembly for a wind turbine and a method for providing heavy lift capability to a wind turbine are provided. The nacelle frame assembly comprises a first hoist substantially permanently mounted along an upper section member of the nacelle frame for performing maintenance operations. The first hoist can move along the upper section member. When having to remove wind turbine parts from the nacelle frame, the first hoist hoists a second hoist and a crane from the workplace ground. Both the second hoist and the crane are then mounted at a rear portion of the nacelle frame. The second hoist and crane are thus temporarily mounted to the nacelle frame. The crane, cooperating with the second hoist, hoists a winch assembly to the nacelle frame until a coupling structure faces the rear portion of the nacelle frame. A carriage structure of the winch assembly is carrying a winch and then becomes removably attached to the rear portion of the nacelle frame. The carriage structure can then be moved towards the parts to be removed from the nacelle frame for lowering these parts through an opening in a lower section member of the nacelle frame.

Similar as described above for EP1 291 521, to be able to lower drive train parts from the nacelle frame described in U.S. Pat. No. 7,735,808, these parts first have to be moved in a direction parallel to the axis of the drive train before they can be removed from the nacelle frame. This again implies that other components in the path of the drive train parts to be replaced also need to be moved or that the nacelle needs to be designed in such a way that there is a wide enough path available to the rear of the wind turbine to remove the large drive train components. This leads to larger, more expensive nacelles.

SUMMARY OF THE INVENTION

The present invention provides a nacelle main frame structure and drive train assembly for being mounted on a tower of a wind turbine. The nacelle main frame structure and drive train assembly comprises:

a nacelle main frame structure comprising a central part connecting a first part to a second part, the first part, during wind turbine operation and/or servicing activities, taking up loads of a rotor supported by that first part, and the second part connecting the nacelle main frame structure to the tower of the wind turbine in a rotatable manner around a vertical axis of the tower, and a drive train of which at least part is located between the first and second part of the nacelle main frame structure.

The central part of the nacelle main frame structure is located substantially above at least part of the drive train and is such that at least part of the drive train can only be removed from the nacelle main frame structure by lowering it from the nacelle main frame structure.

With lowering at least part of the drive train from the nacelle main frame structure is meant moving at least part of the drive train in a direction away from the central part of the nacelle main frame structure and towards the ground on which the wind turbine is positioned.

With servicing activities is meant the performance of maintenance and/or replacement of drive train components, any activity which requires complete or partial removal of the drive train from the nacelle main frame structure and/or any other activity like, for example, oil or filter replacement.

An advantage of a wind turbine nacelle main frame structure and drive train assembly according to embodiments of the invention is that parts of the drive train, such as the gearbox and/or generator, can easily be removed from the nacelle main frame structure or are easily accessible for, for example, servicing activities without having to remove the rotor from the nacelle main frame structure.

In a wind turbine nacelle main frame structure and drive train assembly according to embodiments of the invention, the nacelle main frame structure can be made relatively light because, as a consequence of the design of the nacelle main frame structure and drive train assembly according to embodiments of the invention, the stiffness of the nacelle main frame structure is increased by the drive train in some embodiments and in other embodiments the drive train replaces the rotor load carrying part of the nacelle frame between the rotor and the part of the nacelle frame that transfers the rotor loads to the tower.

Furthermore, in a wind turbine nacelle main frame structure and drive train assembly according to embodiments of the invention, drive train components such as gearbox and/or generator do not have to be substantially moved axially before they can be removed from the nacelle main frame structure. A small axial movement may only be required for disconnecting the couplings between the rotor and the gearbox. Consequently, other parts present in the nacelle main frame structure and drive train assembly do not have to be moved aside when at least part of the drive train has to be removed from the nacelle main frame structure.

Moreover, in a wind turbine nacelle main frame structure and drive train assembly according to embodiments of the invention, once drive train components such as gearbox and/or generator are removed from the main frame structure, the main frame structure on itself may be strong enough to carry the weight of the rotor. This is an advantage because otherwise the nacelle main frame structure could be damaged by the rotor loads, which are a combination of static loads coming from the weight of the rotor and dynamic loads (or wind loads) during stand still of the wind turbine.

According to embodiments of the invention, the drive train may comprise a gearbox and generator. According to other embodiments of the invention, the drive train may comprise only a generator.

According to embodiments of the invention wherein the drive train comprises a gearbox and a generator, an axial distance between the first and second part of the nacelle main frame structure may be equal to at least the sum of the axial length of the gearbox and the axial length of the generator. According to other embodiments of the invention, the axial distance between the first and second part of the nacelle main frame structure may be slightly smaller than the sum of the axial length of the gearbox and the axial length of the generator.

With the axial distance between the first and second part of the nacelle main frame structure being slightly smaller than the sum of the axial length of the gearbox and the axial length of the generator is meant that for placing or removing the drive train from the nacelle main frame structure, the first and second part of the nacelle main frame structure may have to be slightly pushed away from each other. When the drive train is in place, the first and second parts are moved back towards each other such that the drive train fits tight in the nacelle main frame structure.

According to other embodiments of the invention wherein the drive train only comprises a generator, the axial distance between the first and second part of the nacelle main frame structure may be equal to at least the axial length of the generator. According to still other embodiments wherein only the gearbox is located between the first part and the second part of the nacelle main frame structure and wherein the generator may be located behind the second part of the nacelle main frame structure or in the second part of the nacelle main frame structure, the axial distance between the first and second part of the nacelle main frame structure may be equal to at least the axial length of the gearbox. Again, according to other embodiments of the invention, the axial distance between the first and second part of the nacelle main frame structure may be slightly smaller than the axial length of the generator or may be slightly smaller than the axial length of the gearbox.

The central part, first part and the second part of the nacelle main frame structure may, according to embodiments of the invention, be integrally formed in one piece and of a same material. For example, the central part, first part and second part of the nacelle main frame structure may, after assembly, be formed of a one piece structural component which is built from components in steel and/or cast iron. According to other embodiments, the central part, first part and second part of the nacelle main frame structure may be formed of different pieces.

According to embodiments of the invention, the rotor may be rotatably supported by at least one main bearing which may be located in the nacelle main frame structure.

In one embodiment, the drive train may comprise a generator and a gearbox and the gearbox may comprise a planet carrier. According to such embodiment, the planet carrier may be supported by planet carrier bearings which are different from the at least one main bearing located on the nacelle main frame structure for supporting the rotor, and the drive train assembly may furthermore comprise a flexible coupling for connecting the gearbox to the rotor.

According to other embodiments, the drive train may comprise a generator and a gearbox and the gearbox may comprise a planet carrier. The planet carrier of the gearbox may be connected to the rotor by means of a rigid coupling element which is movable in a direction substantially parallel to the axis of the drive train, thereby allowing decoupling of the rotor and gearbox planet carrier so that the planet carrier is rotatably located with regard to the gearbox housing by means of the at least one main bearing situated on the nacelle main frame structure.

According to further embodiments, the nacelle main frame structure may be formed by an inverted bedplate. With inverted bedplate is meant that the drive train is located underneath the bedplate, which is contrary to known designs having a bedplate where the drive train is located on top of the bedplate. This may also be referred to as up-side-down bedplate.

According to still further embodiments, the drive train may comprise a generator and a gearbox and the rotor may be rotatably supported by at least one main bearing which may be located in the gearbox. According to embodiments of the invention, the rotor may be rotatably supported by one main bearing. According to other embodiments, the rotor may be rotatably supported by two main bearings.

According to embodiments of the invention, the nacelle main frame structure may furthermore comprise a strengthening structure for strengthening the nacelle main frame structure when the drive train is removed from the nacelle main frame structure. According to embodiments of the invention, the strengthening structure may be provided in between the first and second part of the nacelle main frame structure. According to other embodiments, the strengthening structure may be attached to and extending between the first part of the nacelle main frame structure and the tower of the wind turbine.

The nacelle main frame structure may furthermore comprise a crane for lowering at least part of the drive train from the nacelle main frame structure. The crane may, according to embodiments of the invention, be located on the central part of the nacelle main frame structure.

According to embodiments of the invention, the central part of the nacelle main frame structure may therefore comprise a groove extending in a direction substantially parallel to the axis of the drive train and the crane may be located on the central part of the nacelle main frame structure above the groove and may be movable along the groove in a direction substantially parallel to the axis of the drive train. A cable may be provided in the groove and extending through the groove for connecting at least part of the drive train to the crane.

According to further embodiments of the invention, the crane may be located on top of the central part of the nacelle main frame structure and may comprise two cables, each cable extending at each side of the nacelle main frame structure for holding the drive train or part thereof. In the latter case, no groove has to be provided in the nacelle main frame structure for providing the cables.

According to still further embodiments of the invention, a nacelle main frame structure and drive train assembly according to embodiments of the invention may be mounted on a tower of a wind turbine, and a crane may be provided on the tower of the wind turbine. The crane may be movably provided on the tower of the wind turbine or may be fixedly provided on the tower of the wind turbine.

An advantage of providing a crane on the nacelle main frame structure or on the tower of the wind turbine is that no external crane is required for removing the gearbox and/or generator from the nacelle for, for example, servicing activities. This is specifically advantageous in case of off-shore wind turbines.

BRIEF DESCRIPTION OF THE DRAWINGS

It has to be noted that same reference signs in the different figures refer to same, similar or analogous elements.

DESCRIPTION OF ILLUSTRATIVE EMBODIMENTS

Figure 1:
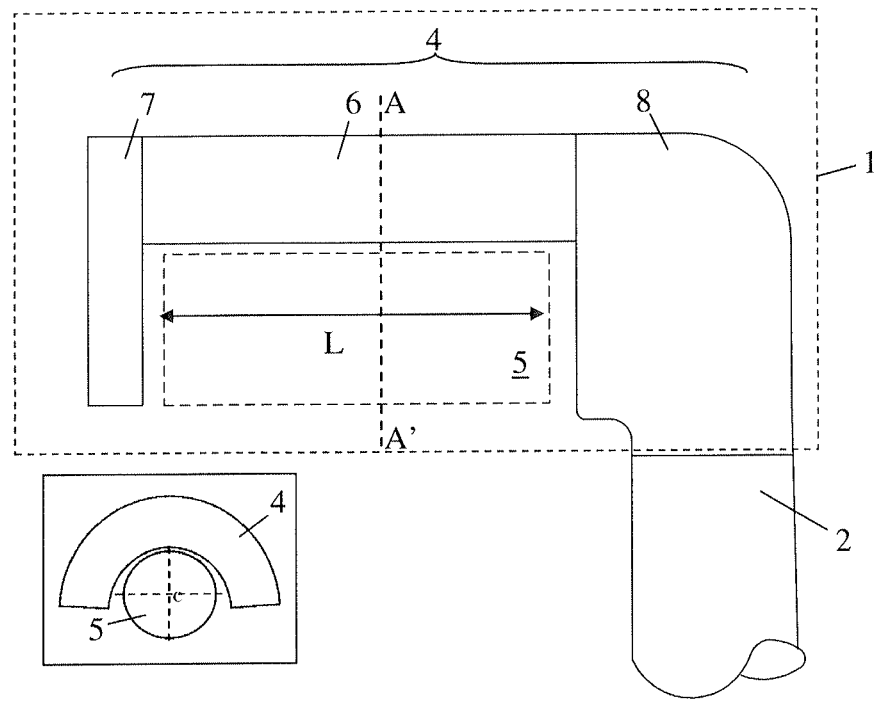
FIG. 1 to FIG. 11 schematically illustrate different embodiments of a nacelle main frame structure and drive train assembly according to embodiments of the invention.

In the description different embodiments will be used to describe the invention. Therefore reference will be made to different drawings. It has to be understood that these drawings are intended to be non-limiting, the invention is only limited by the claims. The drawings are thus for illustrative purposes, the size and/or shape of some of the elements in the drawings may be exaggerated for clarity purposes.

The term "comprising" is not to be interpreted as limiting the invention in any way. The term "comprising", used in the claims, is not intended to be restricted to what means is described thereafter; it does not exclude other elements, parts or steps.

The term "connected" as used in the claims and in the description has not to be interpreted as being restricted to direct connections, unless otherwise specified. Thus, part A being connected to part B is not limited to part A being in direct contact to part B, but also includes indirect contact between part A and part B, in other words also includes the case where intermediate parts are present in between part A and part B.

Not all embodiments of the invention comprise all features of the invention. In the following description and claims, any of the claimed embodiments can be used in any combination.

The present invention will now be described by means of different embodiments. It has to be understood that these embodiments are only for the ease of understanding the invention and are not intended to limit the invention in any way.

Figure 2:
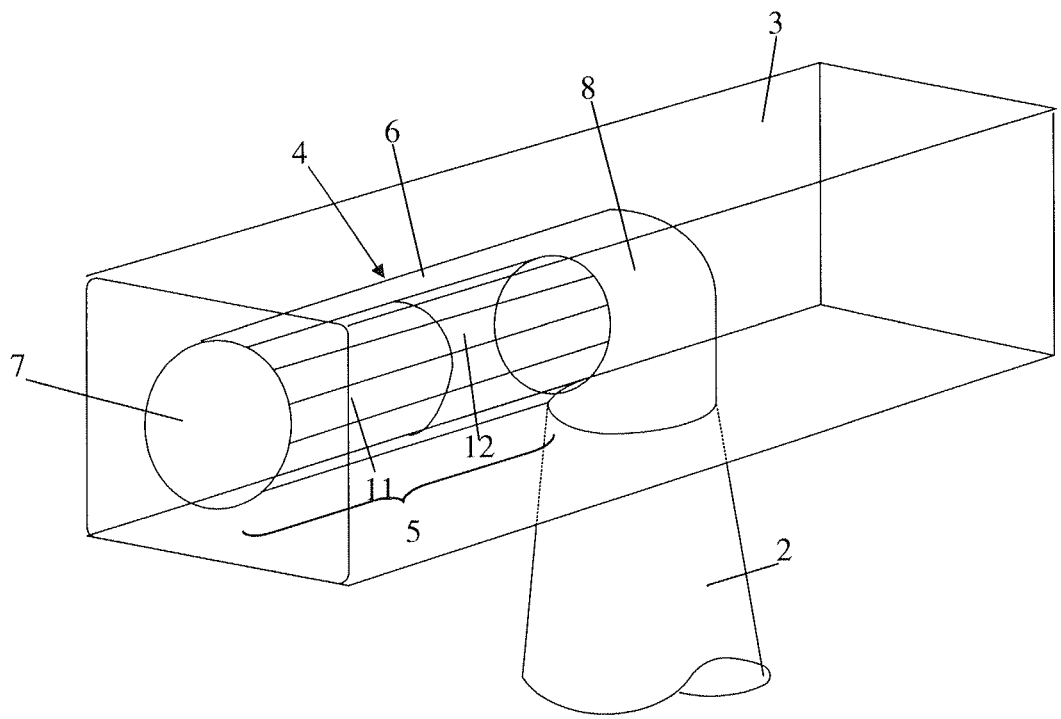

The present invention provides a nacelle main frame structure and drive train assembly 1 for being mounted on a tower 2 of a wind turbine. This is schematically illustrated in FIG. 1. According to embodiments of the invention but not necessarily so, a framework may be provided around the nacelle main frame structure and drive train assembly 1. This framework may be referred to as nacelle 3 (see FIG. 2).

The nacelle main frame structure and drive train assembly 1 comprises a nacelle main frame structure 4 and a drive train 5. The nacelle main frame structure 4 comprises a central part 6 connecting a first part 7 with a second part 8. The first part 7 supports the rotor (not shown in FIG. 1 and FIG. 2) of the wind turbine. During wind turbine operation and/or servicing activities, this first part 7 takes up loads coming from the rotor. With servicing activities is meant maintenance, replacement of drive train components, or any activity which require complete or partial removal of the drive train and/or any other activity like, for example, oil or filter replacement. The second part 8 is for connecting the nacelle main frame structure 4 to the tower 2 of the wind turbine in a rotatable manner around a vertical axis of the tower 2.

At least part of the drive train 5 is located between the first part 7 and the second part 8 of the nacelle main frame structure 4. The central part 6 of the nacelle main frame structure 4 is located substantially above at least part of the drive train 5 and is such that at least part of the drive train 5 can only be removed from the nacelle 1 by lowering it from the nacelle main frame structure 4. With the central part 6 of the nacelle main frame structure 4 being located substantially above at least part of the drive train 5 is meant that, in cross section, most of the material of the central part 6 is above the centre C of the drive train 5. This is schematically illustrated in the insert of FIG. 1, which shows a cross-section along line A-A' of FIG. 1. This illustration is not intended to limit the invention in any way and is only an example to make clear what is meant with most of the material of the central part 6 is above the centre C of the drive train 5.

It has to be understood that the term "drive train" used throughout the description and claims is meant to comprise a gearbox and a generator or only a generator as will be specified in the different embodiments.

With lowering at least part of the drive train from the nacelle main frame structure 4 is meant moving at least part of the drive train in a direction away from the central part 6 of the nacelle main frame structure 4 and towards the ground on which the wind turbine is positioned.

According to embodiments of the invention, the axial distance between the first part 7 and the second part 8 of the nacelle main frame structure 4 may at least be equal to the axial length L of the drive train 5. In other words, the axial distance between the first part 7 and the second part 8 of the nacelle main frame structure 4 may at least be equal to the sum of the axial length of the gearbox and the axial length of the generator, in case the drive train comprises a gearbox and a generator. In case the drive train only comprises a generator, the axial distance between the first part 7 and the second part 8 of the nacelle main frame structure 4 may at least be equal to at least the axial length of the generator. In case only part of the drive train 5, i.e. only the gearbox, is located in between the first part 7 and the second part 8 of the nacelle main frame structure 4 (see further) the axial distance between the first part 7 and the second part 8 of the nacelle main frame structure 4 may at least be equal to the axial length of the gearbox.

According to further embodiments, the axial distance L between the first part 7 and the second part 8 of the nacelle main frame structure 4 may be slightly smaller than the sum of the axial length of the gearbox and the axial length of the generator. With the axial distance L between the first part 7 and the second part 8 of the nacelle main frame structure 4 being slightly smaller than the sum of the axial length of the gearbox and the axial length of the generator is meant that for placing or removing the drive train 5 from the nacelle main frame structure 4, the first part 7 and the second part 8 of the nacelle main frame structure 4 may have to be slightly pushed away from each other. When the drive train 5 is in place, the first part 7 and the second part 8 are moved back towards each other.

In FIG. 1 the three parts 6, 7, 8 of the nacelle main frame structure 4 are shown as separate parts. However, the central part 6, first part 7 and second part 8 of the nacelle main frame structure 4 may, according to embodiments of the invention, be integrally formed in one piece and of a same material. For example, the central part 6, first part 7 and second part 8 of the nacelle main frame structure 4 may, after assembly, be formed of a one piece structural component which is built from components in steel and/or cast iron.

An advantage of a nacelle main frame structure and drive train assembly 1 according to embodiments of the invention is that parts of the drive train 5, such as the gearbox and/or generator, can easily be removed from the nacelle main frame structure 4 or are easily accessible for, for example, performing servicing activities without having to remove the rotor from the nacelle main frame structure 4. With servicing activities is meant maintenance and/or replacement of drive train components, and/or any activity which require complete or partial removal of the drive train 5 from the nacelle main frame structure 4 and/or any other activity like, for example, oil or filter replacement.

Furthermore, the nacelle main frame structure 4 can be made relatively light. This is because, as a consequence of the design of the nacelle main frame structure and drive train assembly 1 according to some embodiments of the invention, the stiffness of the nacelle main frame structure 4 is increased by the drive train 5. Therefore, according to these embodiments the drive train 5 may be referred to as stress member. According to other embodiments this is because the drive train 5 is part of the rotor load carrying part of the nacelle main frame structure 4 between the rotor and the part of the nacelle main frame structure 4 that transfers the rotor loads to the tower 2.

A further advantage of a nacelle main frame structure and drive train assembly 1 according to embodiments of the invention, is that the drive train components such as gearbox and/or generator do not have to be substantially moved axially before they can be removed from the nacelle main frame structure 4. Axial movement is only required for disconnecting the couplings between the rotor and the drive train 5.

Moreover, in a nacelle main frame structure and drive train assembly 1 according to embodiments of the invention, once the drive train components such as gearbox and/or generator are removed from the main frame structure, the nacelle main frame structure 4 is designed such that it is substantially strong enough to carry the weight of the rotor. According to embodiments of the invention, either the remaining nacelle main frame structure 4 itself is strong enough or the nacelle main frame structure 4 may comprise a strengthening structure (see further). This is an advantage because otherwise the nacelle main frame structure 4 could be damaged by the rotor loads, which are a combination of static loads coming from the weight of the rotor and dynamic loads or wind loads during stand still of the wind turbine.

Hereinafter, different implementations of a nacelle main frame structure and drive train assembly 1 according to embodiments of the invention will be described. It has to be understood that this is only for the purpose of illustrating the invention and is not intended to limit the invention in any way.

It has to be noticed that the concept of a nacelle main frame structure and drive train assembly 1 according to embodiments of the invention can be used with any suitable gearbox type and with any suitable generator type as known by a person skilled in the art. Furthermore, the concept of a nacelle main frame structure and drive train assembly 1 according to embodiments of the invention can be used with any type of wind turbine of any power rating as known by a person skilled in the art, for upwind and downwind wind turbines, and for on-shore and off-shore wind turbines.

Figure 3:
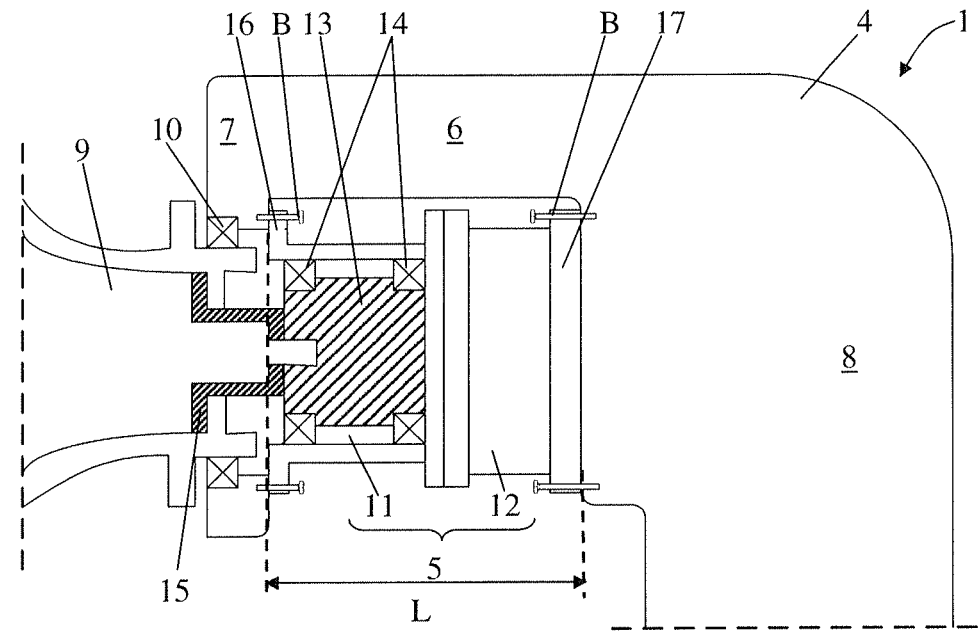

FIG. 3 shows a first implementation of a nacelle main frame structure and drive train assembly 1 according to embodiments of the invention. The rotor 9 is rotatably supported with respect to the nacelle main frame structure 4 by at least one main bearing 10 which, according to the present example, may be located in the nacelle main frame structure 4. In other words, in the example given, the rotor 9 is connected to the main frame structure 4 through the at least one main bearing 10.

A drive train 5 is located in between the first part 7 and the second part 8 of the nacelle main frame structure 4. In the present example, the drive train 5 comprises a gearbox 11 and a generator 12. The axial distance L between the first part 7 and the second part 8 may be equal to the sum of the axial length of the gearbox 11 and the axial length the generator 12. However, according to other embodiments of the invention and as already described earlier, the axial distance L between the first part 7 and the second part 8 of the nacelle main frame structure 4 may be slightly smaller than the sum of the axial length of the gearbox 11 and the axial length of the generator 12.

The gearbox 11 comprises a planet carrier 13 which is supported by planet carrier bearings 14 which are, according to the present embodiment, different from the at least one main bearing 10 which supports the rotor 9. In other words, the planet carrier 13 is rotatably supported by its own planet carrier bearings 14 with respect to the gearbox housing. The planet carrier 13 comprises planet shafts for supporting planet gears (not shown in the drawings).

Because the rotor 9 and the planet carrier 13 each have their own bearings 10 respectively 14 and because misalignment will occur, according to the present embodiment, a flexible coupling 15 may be provided between the rotor 9 and the gearbox 11 in order to correct for the misalignment between the gearbox 11 and the rotor 9.

Further in the present example, the drive train 5 is connected to the first and second part 7, 8 of the nacelle main frame structure 4. Hereby, the gearbox 11 is connected to the first part 7 of the nacelle main frame structure 4 via flange 16 and the generator 12 is connected to the second part 8 of the nacelle main frame structure 4 through flange 17. Connection may, for example, be done by bolt connections (indicated by B in FIG. 3).

Furthermore, as known by a person skilled in the art, means for centring the drive train 5 in the nacelle main frame structure 4 may be provided.

Figure 4:
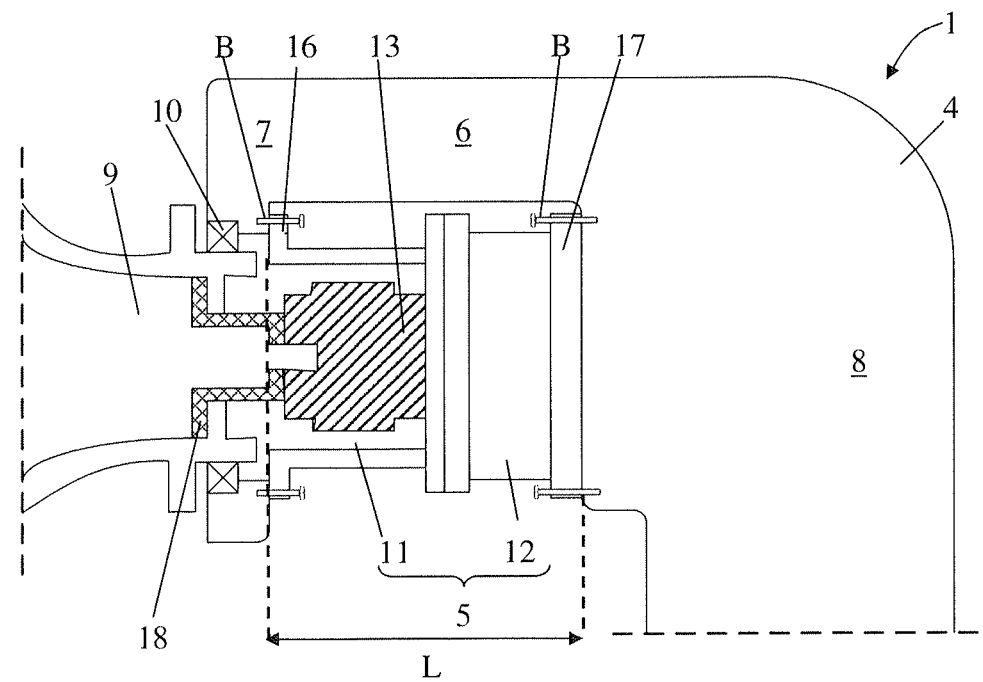

FIG. 4 shows a second implementation of a nacelle main frame structure and drive train assembly 1 according to embodiments of the invention. Similar as in the example described with respect to FIG. 3, the rotor 9 is rotatably supported by at least one main bearing 10 which is located in the nacelle main frame structure 4. Thus, the rotor 9 is connected to the nacelle main frame structure 4 through the at least one main bearing 10.

A drive train 5 is located between the first part 7 and the second part 8 of the nacelle main frame structure 4. The drive train 5 comprises, in the example given, a gearbox 11 and a generator 12. The axial distance L between the first part 7 and the second part 8 of the nacelle main frame structure 4 may be equal to the sum of the axial length of the gearbox 11 and the axial length of the generator 12 or, according to other embodiments, may be slightly smaller than the sum of the axial length of the gearbox 11 and the axial length of the generator 12. The gearbox 11 comprises a planet carrier 13 which, unlike the embodiment described with respect to FIG. 3, does not have its own bearings. According to the present embodiment, the at least one main bearing 10 also supports the planet carrier 13. The planet carrier 13 may, according to the example in FIG. 4, directly be connected to the rotor 9 by means of a coupling element 18. The coupling element 18 may be a substantially rigid part which is moveable in a direction substantially parallel to the axis of the drive train 5 for allowing disassembly of the drive train 5 during servicing activities. Consequently, the rotor/gearbox coupling is a fixed coupling.

Again similar as in the example in FIG. 3, the gearbox 11 is connected to the first part 7 of the nacelle main frame structure 4 through flange 16. The generator 12 is connected to the second part 8 of the nacelle main frame structure 4 through flange 17. Connection may, for example, be done by bolt connections (indicated by B in FIG. 4).

Furthermore, as known by a person skilled in the art, means for centring the drive train 5 in the nacelle main frame structure 4 may be provided.

Figure 5:
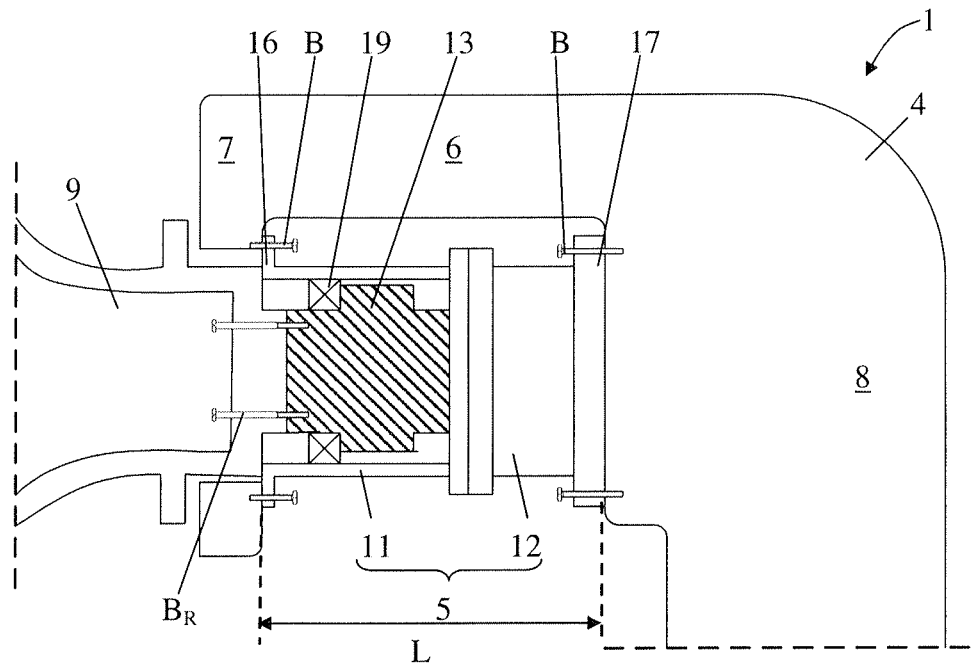
Figure 6:
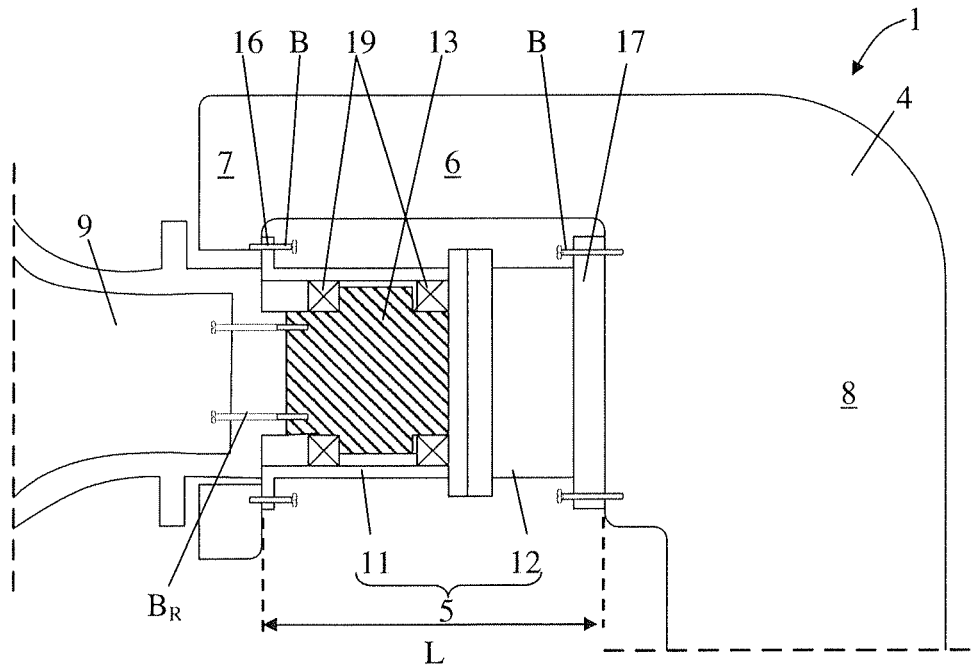

Another implementation of a nacelle main frame structure and drive train assembly 1 according to embodiments of the invention is illustrated in FIG. 5 and FIG. 6. According to these embodiments, the rotor 9 is directly connected to the planet carrier 13 by means of, for example, a bolt connection (indicated by $B_R$ in FIG. 5 and FIG. 6).

A drive train 5 is located between the first part 7 and the second part 8 of the nacelle main frame structure 4. The drive train 5 comprises a gearbox 11 and a generator 12. The axial distance L between the first part 7 and the second part 8 of the nacelle main frame structure 4 may be equal to the sum of the axial length of the gearbox 11 and the axial length of the generator 12 or, according to other embodiments, may be slightly smaller than the sum of the axial length of the gearbox 11 and the axial length of the generator 12. The drive train 5 is connected to the first part 7 and to the third part 8 of the nacelle main frame structure 4. Such connection may be done by means of, for example, bolts (indicated by B in FIG. 5 and FIG. 6). The gearbox 11 is connected to the first part 7 of the nacelle main frame structure 4 by means of flange 16. The generator 12 is connected to the second part 8 of the nacelle main frame structure 4 by means of flange 17.

In the examples of FIG. 5 and FIG. 6, the rotor 9 is rotatably supported by at least one bearing 19. The at least one bearing 19 for rotatably supporting the rotor 9 is, according to the present embodiment, located in the gearbox 11 and is also used for rotatably supporting the planet carrier 13. According to embodiments of the invention and as illustrated in FIG. 5, the rotor 9 may be rotatably supported by one bearing 19, while according to other embodiments and as illustrated in FIG. 6 the rotor 9 may be rotatably supported by two bearings 19.

In the examples described above with respect to FIG. 3, FIG. 4, FIG. 5 and FIG. 6, because of the design of the nacelle main frame structure and drive train assembly 1, the central part 6 of the nacelle main frame structure 4 is used as a load carrying structure. Because of that, during operation of the wind turbine, bending moments and loads will be transferred from the rotor 9 to the tower 2 through the nacelle main frame structure 4 as well as through the drive train 5.

When servicing activities have to be performed, at least part of the drive train 5 can be lowered from the nacelle main frame structure 4 as the nacelle main frame structure 4 does not form an obstruction for such lowering in any way. Therefore, the gearbox 11 nor the generator 12 have to be substantially moved axially for allowing them to be removed from the nacelle main frame structure 4. The only axial movement that may be required is for disconnecting the couplings between the rotor 9 and the gearbox 11.

Once the drive train 5 or part of the drive train 5 is removed from the nacelle main frame structure 4, the nacelle main frame structure 4 can support the rotor 9, such that the rotor 9 does not have to be removed from the nacelle main frame structure 4 during such servicing activities.

Figure 7:
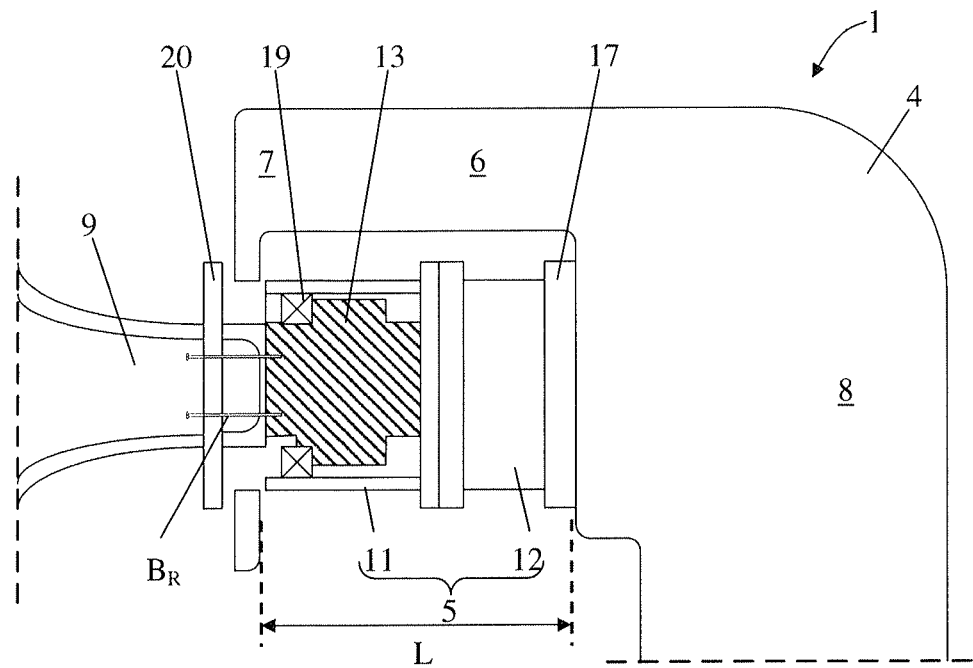

FIG. 7 shows a further implementation of a nacelle main frame structure and drive train assembly 1 according to embodiments of the invention. Similar as in the examples of FIG. 5 and FIG. 6, the rotor 9 is rotatably supported by at least one bearing 19 which is located in the gearbox 11 and which also serves for rotatably supporting the planet carrier 13 of the gearbox 11. Only an example of the rotor 9 being supported by one bearing 19 is shown in the drawings. It has to be understood that this is not intended to limit the invention in any way, the implementation according to this embodiment may, similar as illustrated in FIG. 6, also comprise a rotor 9 which is supported by two bearings 19 which also serve for rotatably supporting the planet carrier 13.

The rotor 9 is directly connected to the planet carrier 13 of the gearbox 11 by means of, for example, bolt connections (indicated by $B_R$ in FIG. 7). Consequently, the rotor/gearbox coupling is a non-flexible or rigid coupling.

In the example given in FIG. 7, the gearbox 11 is not connected to the nacelle main frame structure 4 but only to the generator 12. The generator 12 is connected to the second part 8 of the nacelle main frame structure 4 by means of flange 17. Hence, according to the present embodiment, the only connection between the nacelle main frame structure 4 and the drive train 5 or part thereof is with the second part 8 of the nacelle main frame structure 4.

According to the present embodiment, during operation of the wind turbine, because of the design of the nacelle main frame structure and drive train assembly 1, substantially all bending moments and loads will be transferred from the rotor 9 to the tower 2 through the drive train 5. Hence, contrary to the embodiments described with respect to FIG. 3 to FIG. 6, in the present embodiments the central part 6 of the nacelle main frame structure 4 is not used as a load carrying structure during normal operation of the wind turbine.

When servicing activities have to be performed, the rotor 9 has to be additionally fixed to the first part 7 of the nacelle main frame structure 4 via flange 20 and by means of, for example, bolts (not shown in FIG. 7). Removing at least part of the drive train 5 can then be performed by lowering it from the nacelle main frame structure 4 as the nacelle main frame structure 4 does not form an obstruction for such lowering in any way. Therefore, the gearbox 11 nor the generator 12 have to be substantially moved axially. The only axial movement that may be required is for disconnecting the couplings between the rotor 9 and the gearbox 11.

Once the drive train 5 or part of the drive train 5 is removed from the nacelle main frame structure 4, the nacelle main frame structure 4 can support the rotor 9, such that the rotor 9 does not have to be removed from the nacelle 1 during such servicing activities.

Figure 8A:
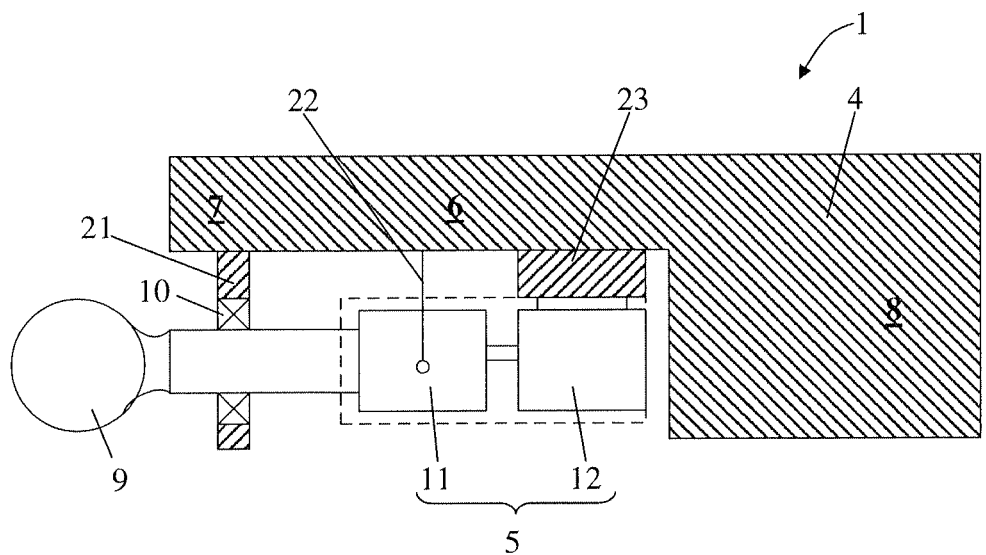
Figure 8B:
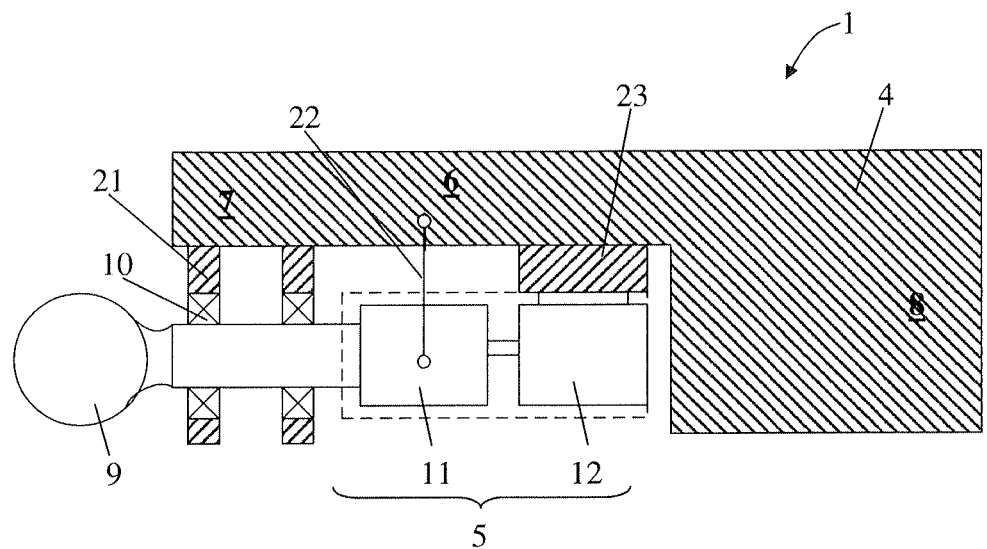

A further implementation of a nacelle main frame structure and drive train assembly 1 according to embodiments of the invention is illustrated in FIG. 8A and FIG. 8B. According to this embodiment, the nacelle main frame structure 4 may be formed by a bedplate. According to the present example the drive train 5 is located under of the bedplate, which is contrary to known designs having a bedplate where the drive train is located on top of the bedplate. Therefore, the nacelle main frame structure 4 according the present embodiment may also be referred to as comprising an inverted bedplate or an upside-down bedplate compared to conventional nacelles.

The rotor 9 may be supported by at least one main bearing 10. According to embodiments of the invention, the rotor 9 may be supported by one main bearing 10 (3-point suspension, see FIG. 8A) or by two main bearings 10 (4-point suspension, see FIG. 8B). The at least one main bearing 10 is connected to the first part 7 of the nacelle main frame structure 4 by means of connecting parts 21.

In the examples given in FIG. 8A and FIG. 8B the drive train 5 comprises a gearbox 11 and a generator 12. The gearbox 11 may be connected to the central part 6 of the nacelle main frame structure 4 by means of a conventional torque arm 22. Consequently, the gearbox/nacelle main frame structure coupling may be a flexible coupling. The generator 12 may be connected to the nacelle main frame structure 4 by means of connection part 23.

In case of 3-point suspension, during operation of the wind turbine, bending moments and loads will be transferred from the rotor 9 to the tower 2 through the nacelle main frame structure 4 as well as through the drive train 5. In case of a 4-point suspension however, during operation of the wind turbine, substantially all bending moments and loads will be transferred from the rotor 9 to the tower 2 through the nacelle main frame structure 4. In both cases, the nacelle main frame structure 4 may, at least partly, function as a load carrying structure.

When servicing activities have to be performed, at least part of the drive train 5 can be lowered from the nacelle main frame structure 4 as the nacelle main frame structure 4 does not form an obstruction for such lowering in any way. Therefore, the gearbox 11 nor the generator 12 have to be substantially moved axially. The only axial movement that may be required is for disconnecting the couplings between the rotor 9 and the gearbox 11.

Once the drive train 5 or part of the drive train 5 is removed from the nacelle main frame structure 4, the nacelle main frame structure 4 can support the rotor 9, such that the rotor 9 does not have to be removed from the nacelle main frame structure 4 during such servicing activities. It has, however, to be noticed that, in case of a 3-point suspension (FIG. 8A), an additional support may be required for supporting the rotor 9 when the drive train 5 or part thereof is removed from the nacelle main frame structure 4.

In all embodiments described above with respect to FIG. 3 to FIGS. 8A and 8B, the central part 6, first part 7 and second part 8 of the nacelle main frame structure 4 may, according to the present embodiment, be integrally formed in one piece and of a same material. However, according to other embodiments of the invention, the central part 6, first part 7 and second part 8 of the nacelle main frame structure 4 may be made of different pieces.

Figure 9:
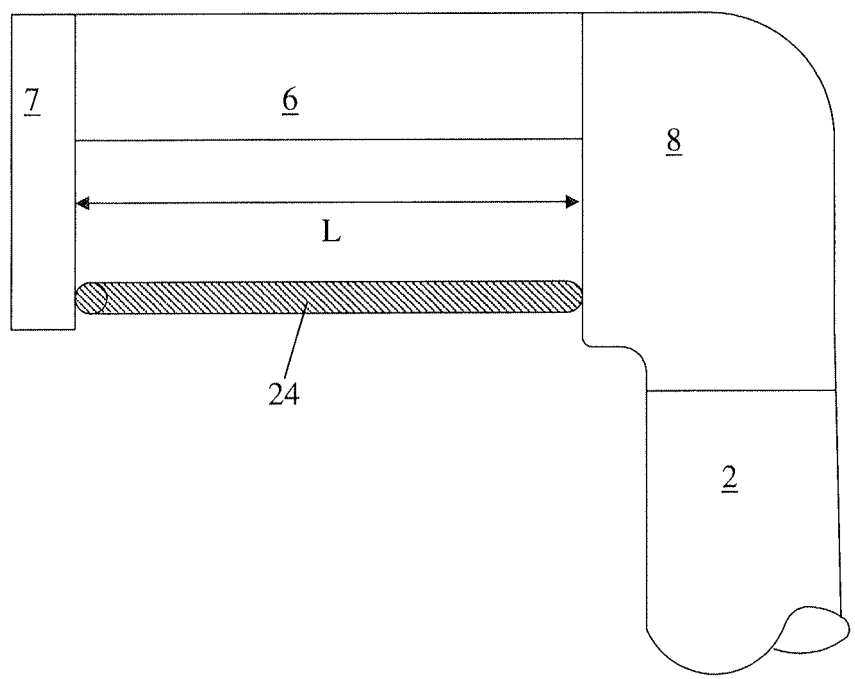

According to embodiments of the invention, measures may be taken to further strengthen the nacelle main frame structure 4 when the drive train 5 or parts thereof have to removed from the nacelle main frame structure 4. Therefore, a strengthening structure 24 may be provided. According to embodiments of the invention, the strengthening structure 24 may be provided in between the first part 7 and the second part 8 of the nacelle main frame structure 4 (see FIG. 9). This may increase stiffness of the nacelle main frame structure and drive train assembly 1 when the drive train 5 or parts thereof are removed from the nacelle main frame structure 4. The strengthening structure 24 may furthermore comprise attachment points for providing means for enlarging the strengthening structure 24 and thus enlarging the axial distance L between the first part 7 and the second part 8 of the nacelle main frame structure 4 with some tenths of a millimeter so as facilitate removal from and/or putting back into the nacelle main frame structure 4 of at least part of the drive train 5. Such means may, for example, be hydraulic cylinders.

Figure 10:
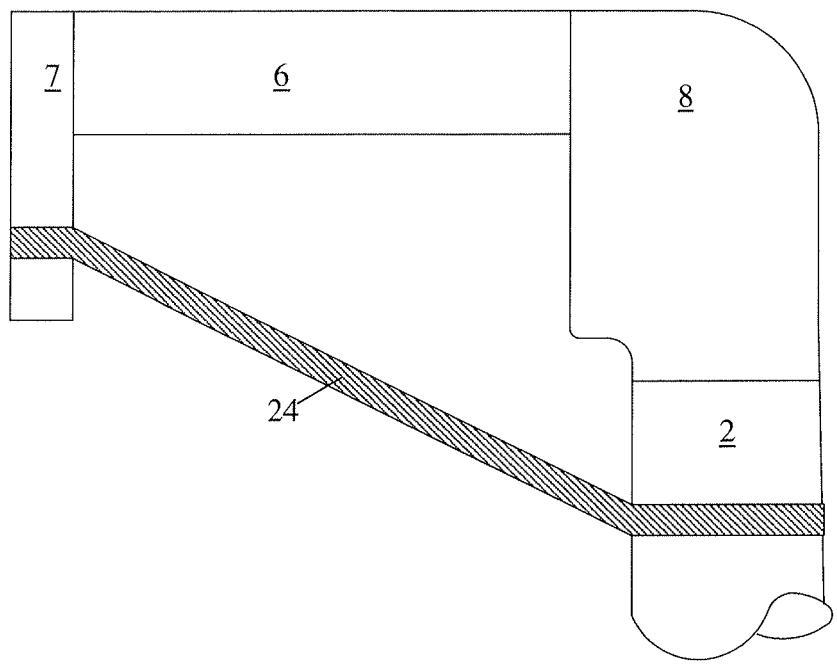

According to other embodiments of the invention, the strengthening structure 24 may be attached to and extending between the first part 7 of the nacelle main frame structure 4 and the tower 2 of the wind turbine (see FIG. 10).

According to embodiments of the invention, the strengthening structure 24 may be a permanent structure, which means that this structure 24 is always present in or at the nacelle main frame structure and drive train assembly 1. According to other embodiments of the invention, the strengthening structure 24 may be a removable structure which is provided only at times when servicing activities are to be performed for which at least part of the drive train 5 has to be removed from the nacelle main frame structure 4. After such activities have been performed, the strengthening structure 24 may then again be removed.

The presence or provision of a strengthening structure 24 as described above may be advantageous for compensating for deformations of the nacelle main frame structure 4 because of the weight of the rotor of the wind turbine when at least part of the drive train 5 is removed from the nacelle 1.

Figure 11:
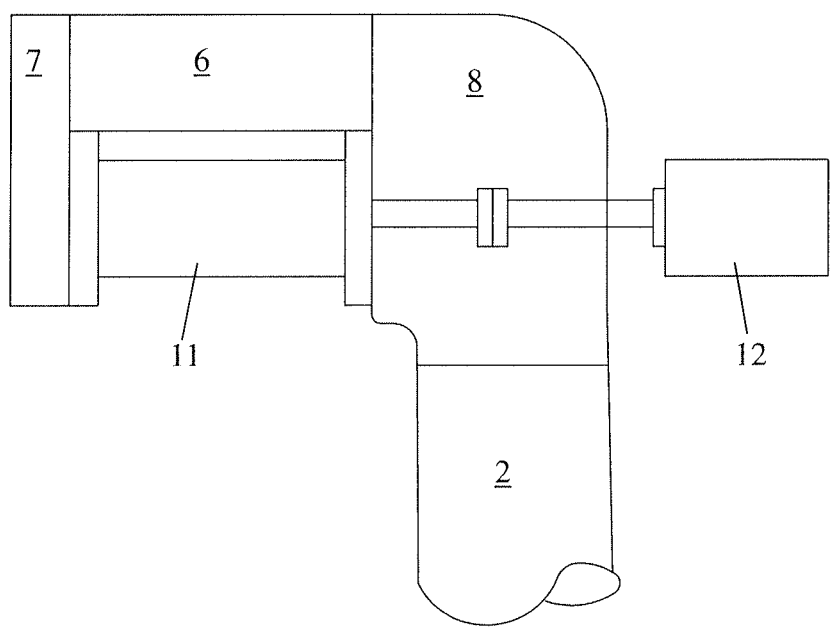
Figure 12:
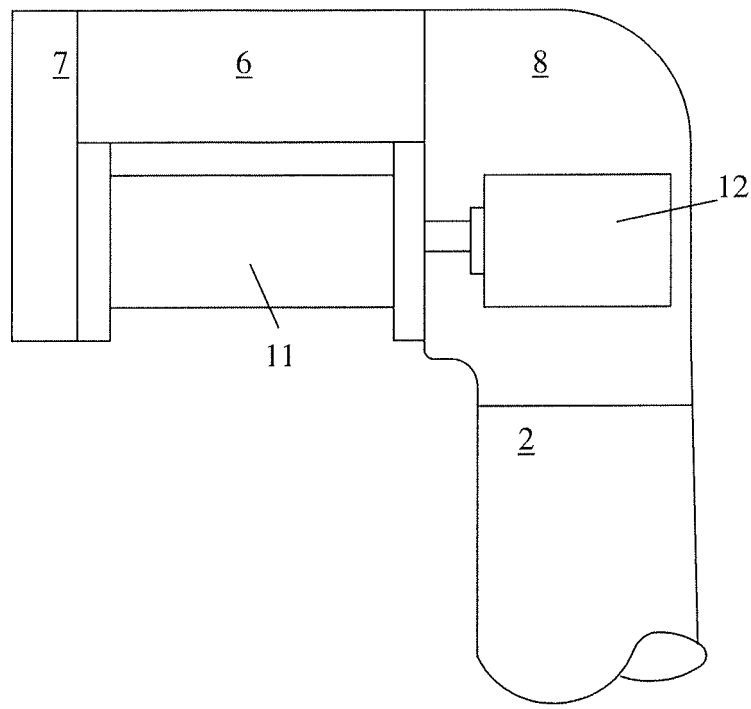
FIG. 12 to FIG. 15 schematically illustrate possible implementations of the provision of a crane according to embodiments of the present invention.

In all embodiments described above, the drive train 5 always comprises a gearbox 11 and a generator 12 which both are located in between the first part 7 and the second part 8 of the nacelle main frame structure 4. According to further embodiments, only part of the drive train 5 may be located between the first part 6 and the second part 7 of the nacelle main frame structure 4. In the embodiments illustrated in FIG. 12 and FIG. 11, only the gearbox 11 is located between the first part 7 and the second part 8 of the nacelle main frame structure 4. FIG. 11 illustrates a first embodiment in which the generator 12 may be located behind the second part 8 of the nacelle main frame structure 4, while in the embodiment illustrated in FIG. 12, the generator 12 may be located in the second part 8 of the nacelle main frame structure 4.

According to still further embodiments, the drive train 5 may only comprise a generator 12. The generator 12 may be located in between the first part 7 and the second part 8 of the nacelle main frame structure 4.

An advantage of a nacelle main frame structure and drive train assembly 1 according to embodiments of the present invention is that the design is such that a crane 25 may be provided on the central part 6 of the nacelle main frame structure 4. Examples thereof are illustrated in FIG. 13 and FIG. 14.

Figure 13:
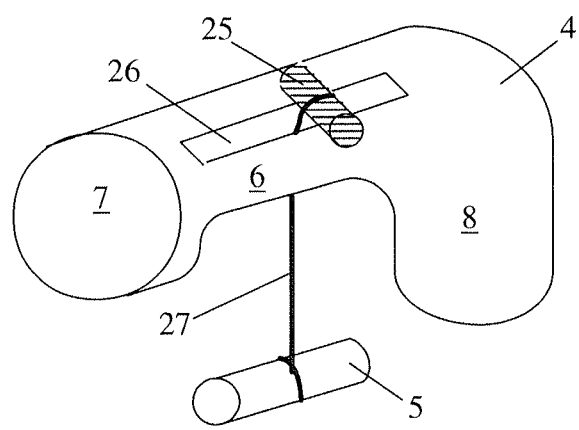

According to a first embodiment which is illustrated in FIG. 13, a groove 26 may be provided in the central part 6 of the nacelle main frame structure 4. The groove 26 may extend in a direction substantially parallel with the axis of the drive train 5. The crane 25 may be located on top of the central part 6 and at the location of, i.e. above the groove 26 and may be movable back and forth along the groove 26 in a direction substantially parallel to the axis of the drive train 5. Therefore, means for displacement of the crane 25 such as e.g. rails may be provided on top of the central part 6 of the nacelle main frame structure 4 (not shown in the drawings). The crane 25 may comprise a cable 27 that extends through the groove 26 for being connected to at least part of the drive train 5. After the cable 27 has been connected, at least part of the drive train 5 can then be lowered for removing it from the nacelle main frame structure 4.

Because the crane 25 is movable, it can be moved towards the location of the drive train 5 or, when only part of the drive train 5 has to be removed, to that part of the drive train 5, e.g. the gearbox 11 or the generator 12.

Figure 14:
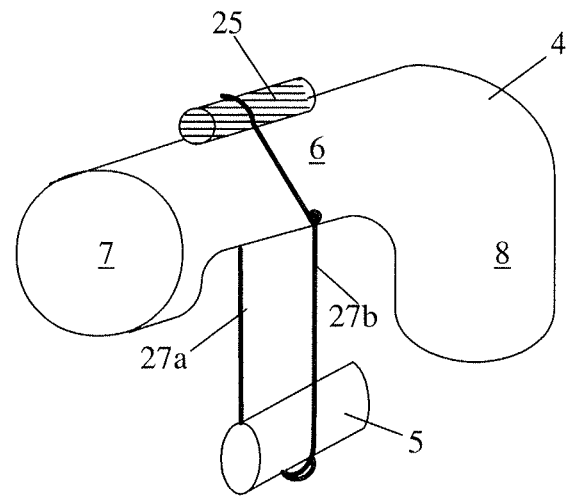

According to a further embodiment illustrated in FIG. 14, the crane 25 may be located on top of the central part 6 of the nacelle main frame structure 4 and may comprise two cables 27a, 27b, each cable 27a, 27b extending at a side of the nacelle main frame structure 4 for holding the drive train 5 or part thereof when lowering it from the nacelle main frame structure 4. The crane 25 may be movable back and forth along the central part 6 in a direction substantially parallel to the axis of the drive train 5. Therefore, means for displacement of the crane 25 such as e.g. rails may be provided on top of the central part 6 of the nacelle main frame structure 4 (not shown in the drawings).

According to other embodiments, a crane 25 may, instead of on top of the central part 6 of the nacelle main frame structure 4, be provided on the tower 2 of the wind turbine. This is illustrated in FIG. 15 and FIG. 16.

Figure 15:
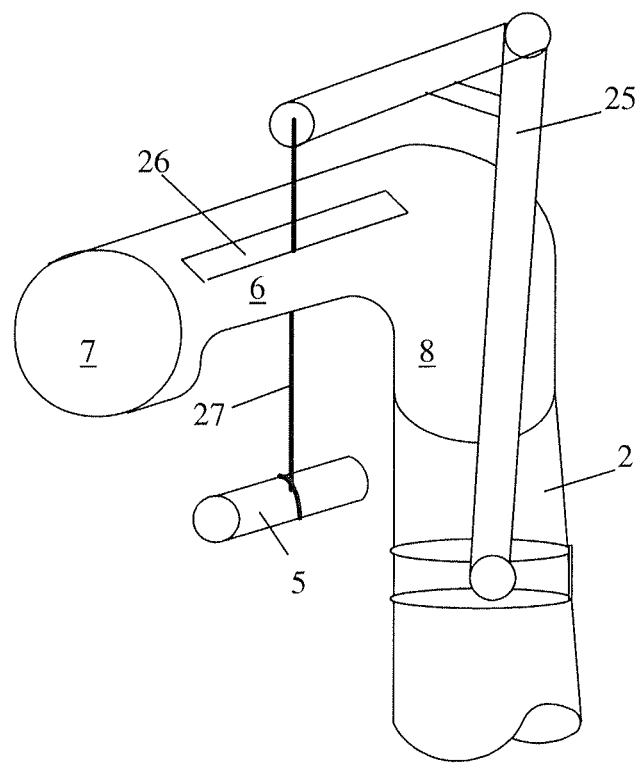

FIG. 15 shows a first implementation of such embodiments. The crane 25 is attached to the tower 2 of the wind turbine. Similar as in the embodiment described with respect to FIG. 13, a groove 26 may be provided in the central part 6 of the nacelle main frame structure 4. The groove 26 extends in a direction substantially parallel with the axis of the drive train 5. A cable 27 is attached to the crane 25 and extends through the groove 26 for being attached to the drive train 5 or part thereof when it has to be lowered from the nacelle main frame structure 4.

Figure 16:
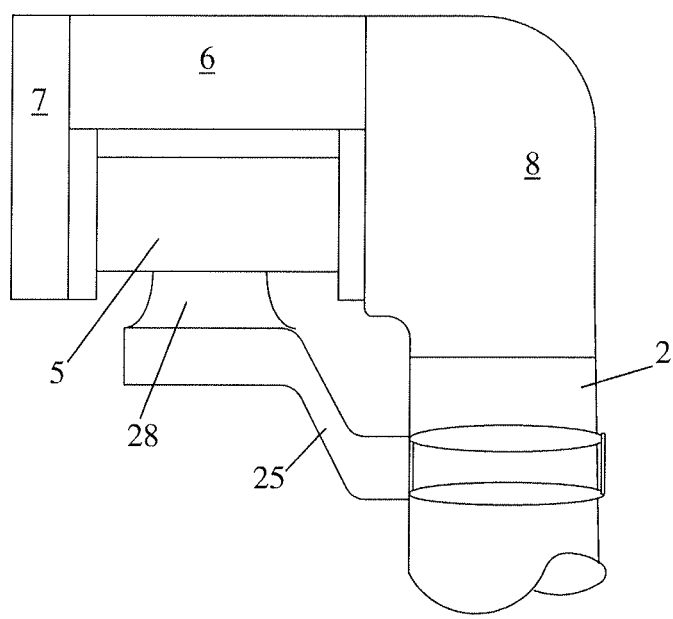
FIG. 16 schematically illustrates an embodiment of a nacelle main frame structure and drive train assembly which is surrounded by a nacelle.

A second implementation is illustrated in FIG. 16. According to this example, the crane 25 may be implemented as a type of lifting device. The crane 25 comprises a carrying structure 28 which is located under the drive train 5 or part thereof. Connections between the drive train 5 and the nacelle main frame structure 4 are untied such that the drive train 5 or part thereof is supported by the carrying structure 28 of the crane 25. The crane 25 can be moved up and down along the tower 2 and in that way the drive train 5 or parts thereof can be lowered from the nacelle main frame structure 4 and, after servicing activities, again be lifted up to be put back into the nacelle main frame structure 4.

An advantage of being able to provide a crane 25 on the nacelle main frame structure 4 or on the tower 2 of the wind turbine is that no external crane is required for removing the gearbox 11 and/or generator 12 from the nacelle main frame structure 4 for, for example, servicing activities. This is specifically advantageous in case of off-shore wind turbines.

In case where the nacelle main frame structure and drive train assembly 1 is surrounded by a framework or nacelle 3, such nacelle 3 may, according to embodiments of the invention, furthermore comprise a platform at a lower side of the nacelle 3 for supporting technicians during servicing activities. Such platform may be located underneath the drive train 5, at a side of the nacelle 3 closest to the ground, the platform being located such that at least part of the drive train 5 can still only be removed from the nacelle main frame structure 4 by lowering it from the nacelle main frame structure 4, as described in the embodiments above. For example, the platform may comprise a door for providing an opening for removing at least part of the drive train 5 from the nacelle main frame structure 4 and from the nacelle 3. The door may have a width at least equal to the axial length L of the drive train 5.

The invention claimed is:

1. A nacelle main frame structure and drive train assembly (1) for being mounted on a tower (2) of a wind turbine having a rotor which rotates about a longitudinal axis, the nacelle main frame structure and drive train assembly (1) comprising:
the nacelle main frame structure (4) which comprises a first part, a second part, and a central part (6), in sequence along the longitudinal axis the first part (7) is connected to the central part which is connected to the second part, the first part of the nacelle main frame structure supports the rotor such that the first part takes up loads of the rotor during at least one of wind turbine operation and servicing activities, and the rotor (9) is connected to a drive train, the second part (8) of the nacelle main frame structure (4) is connected to the tower (2) of the wind turbine such that the second part and the nacelle main frame structure rotate about a vertical axis defined by the tower (2), and
the central part of the nacelle main frame structure and at least a portion of the drive train (5) are located along the longitudinal axis between the first part (7) and the second part (8) of the nacelle main frame structure (4),
wherein the central part (6) of the nacelle main frame structure (4) is located, with reference to the vertical axis, substantially above at least part of the drive train (5) and is arranged such that at least part of the drive train (5) is removed from the nacelle main frame structure (4) by lowering at least part of the drive train (5) vertically downward from the central part of the nacelle main frame structure (4).

2. The nacelle main frame structure and drive train assembly (1) according to claim 1, wherein the drive train (5) comprises either a gearbox (11) and a generator (12) or only the generator (12).

3. The nacelle main frame structure and drive train assembly (1) according to claim 1, wherein the rotor (9) is rotatably supported by at least one main bearing (10), and the at least one main bearing (10) is located in the first part of the nacelle main frame structure (4).

4. The nacelle main frame structure and drive train assembly (1) according to claim 1, wherein the drive train (5) comprises a gearbox (11) and a generator (12) and the gearbox (11) comprises a planet carrier (13), the planet carrier (13) is supported by planet carrier bearings (14) which are offset along the longitudinal axis from the at least one main bearing (10), and the nacelle main frame structure and drive train assembly (1) furthermore comprises a flexible coupling (15) which couples the gearbox (11) to the rotor (9).

5. The nacelle main frame structure and drive train assembly (1) according to claim 3, wherein the drive train (5) aligned substantially parallel to the longitudinal axis and comprises a gearbox (11) and a generator (12) and the gearbox (11) comprises a planet carrier (13), and the planet carrier (13) is connected to the rotor (9) by a coupling element (18) which is movable in a direction along the longitudinal axis.

6. The nacelle main frame structure and drive train assembly (1) according to claim 3, wherein the nacelle main frame structure (4) is formed by an inverted bedplate.

7. The nacelle main frame structure and drive train assembly (1) according to claim 1, wherein the drive train (5) comprises a gearbox (11) and a generator (12), the rotor (9) is rotatably supported by at least one bearing (19), and the at least one bearing (19) is located in the gearbox (11).

8. The nacelle main frame structure and drive train assembly (1) according to claim 1, wherein the nacelle main frame structure further comprises a strengthening structure (24) having one end that is secured to the first part for strengthening the nacelle main frame structure (4) when the drive train (5) is removed from the nacelle main frame structure (4).

9. The nacelle main frame structure and drive train assembly (1) according to claim 8, wherein the strengthening structure is elongated and has one end that is fixed to the first part (7) and an opposite end that is fixed to the second part (8) of the nacelle main frame structure (4).

10. The nacelle main frame structure and drive train assembly (1) according to claim 1, wherein the strengthening structure (24) has a first end that is fixed to the first part (7) of the nacelle main frame structure (4) and a second end that is fixed to the tower (2) of the wind turbine at a position along the vertical axis below the second part of the nacelle main frame structure.

11. The nacelle main frame structure and drive train assembly (1) according to claim 1, further comprising a crane (25) for lowering at least part of the drive train (5) from the nacelle main frame structure (4) during assembly and disassembly of the nacelle main frame structure.

12. The nacelle main frame structure and drive train assembly (1) according to claim 11, wherein the crane (25) is supported by the central part (6) of the nacelle main frame structure (4) and is arranged vertically above the nacelle main frame, structure.

13. The nacelle main frame structure and drive train assembly (1) according to claim 12, wherein the central part (6) of the nacelle main frame structure (4) comprises a groove (26) that extends in a direction substantially parallel to the longitudinal axis and the crane (25) is located vertically above the groove (26) and is movable along the groove (26) in a direction substantially parallel to the longitudinal axis.

14. The nacelle main frame structure and drive train assembly (1) according to claim 12, wherein the crane (25) comprises first and second cables (27a, 27b), the first and the second cables (27a, 27b) extend over opposite lateral sides of the central part of the nacelle main frame structure (4) and support at least a portion of the drive train (5).

15. The nacelle main frame structure and drive train assembly (1) according to claim 1, wherein the nacelle main frame structure and drive train assembly is mounted on the tower (2) of a wind turbine, and a crane (25) is secured to the tower (2) of the wind turbine, the crane having at least one cable that passes through the nacelle main frame structure and is connectable with at least a portion of the drive train.

16. A nacelle main frame structure and drive assembly which is mounted on a tower of a wind turbine having a rotor that rotates about a longitudinal axis, the nacelle main frame structure and drive train assembly comprising:
   a first section, a central section, and a second section that are aligned with respect to each other along the longitudinal axis, the first section is connected to one axial side of the central section and an opposite axial side of the central section is secured to the second section such that the first, the central and the second sections form the nacelle main frame structure;
   the first section rotatably supports the rotor of the wind turbine and takes up loads of the rotor during operation and repair of the wind turbine, the rotor is connected to a drive train which comprises a gearbox and a generator, a sum of an axial length of the gearbox and an axial length of the generator along the longitudinal axis is either greater than or equal to an axial distance of separation along the longitudinal axis between the first and the second sections, the axial distance of separation between the first and the second sections forms a recess in the nacelle main frame structure, and at least a portion of the drive train either enters or exits the recess only from vertically below the central section; and
   the second section of the nacelle main frame structure is rotatably fixed to the tower of the wind turbine such that the nacelle main frame structure is rotatable about a vertical axis which is defined by the tower.

17. The nacelle main frame structure and drive assembly according to claim 16, wherein an entirety of the first and the central sections are longitudinally spaced Prom the vertical axis such that only the second section is arranged vertically above the tower of the turbine.

18. The nacelle main frame structure and drive assembly according to claim 16, wherein an axial end of the gearbox comprises a flange that is fixed to the first section of the nacelle main frame structure and an axial end of the generator comprises a flange that is fixed to the second section of the nacelle main frame structure.

* * * * *